United States Patent
Na et al.

(10) Patent No.: US 10,900,855 B2
(45) Date of Patent: Jan. 26, 2021

(54) PRESSURE SENSOR APPARATUS AND METHOD FOR MANUFACTURING PRESSURE SENSOR APPARATUS AND PRESSURE SENSOR ASSEMBLY

(71) Applicant: ITM SEMICONDUCTOR CO., LTD., Chungcheongbuk-do (KR)

(72) Inventors: Hyuk Hwi Na, Chungcheongbuk-do (KR); Ho Seok Hwang, Gyeonggi-do (KR); Ja Guen Gu, Chungcheongbuk-do (KR); Dong Hee Lee, Chungcheongbuk-do (KR); Hyang Won Kang, Chungcheongbuk-do (KR); Hyung Jin Lim, Chungcheongbuk-do (KR); Yeong Seol Kwon, Daejeon (KR)

(73) Assignee: ITM SEMICONDUCTOR CO., LTD., Chungcheongbuk-Do (KR)

( * ) Notice: Subject to any disclaimer, the term of this patent is extended or adjusted under 35 U.S.C. 154(b) by 278 days.

(21) Appl. No.: 16/085,737

(22) PCT Filed: Mar. 9, 2017

(86) PCT No.: PCT/KR2017/002566
§ 371 (c)(1),
(2) Date: Sep. 17, 2018

(87) PCT Pub. No.: WO2017/164549
PCT Pub. Date: Sep. 28, 2017

(65) Prior Publication Data
US 2019/0086282 A1    Mar. 21, 2019

(30) Foreign Application Priority Data
Mar. 23, 2016    (KR) .................... 10-2016-0034720

(51) Int. Cl.
*G01L 13/06* (2006.01)
*G01L 17/00* (2006.01)
(Continued)

(52) U.S. Cl.
CPC ............ *G01L 13/06* (2013.01); *G01D 11/245* (2013.01); *G01L 5/10* (2013.01); *G01L 17/00* (2013.01);
(Continued)

(58) Field of Classification Search
CPC . G01L 13/06; G01L 17/00; G01L 5/10; G01L 19/06; G01L 19/143; G01L 19/147;
(Continued)

(56) References Cited

U.S. PATENT DOCUMENTS 4,879,903 A * 11/1989 Ramsey .............. G01L 19/0084
73/431
9,021,689 B2 * 5/2015 Hooper ................. H01L 23/315
29/841

FOREIGN PATENT DOCUMENTS

CN    102980711 A    3/2013
CN    104198107 A    12/2014
(Continued)

OTHER PUBLICATIONS

Translation of KR-20070104194-A (Year: 2007).*
Translation of JP-2000055761-A (Year: 2000).*
Translation of JP-09178596-A (Year: 1997).*

*Primary Examiner* — Nathaniel T Woodward
(74) *Attorney, Agent, or Firm* — Stuart H. Mayer; Mayer & Williams PC (57) ABSTRACT

Provided is a pressure sensor apparatus including a lead frame, a pressure sensing element mounted on the lead frame to measure a relative pressure between a first part and a second part, and a housing including a reference medium
(Continued)

inlet hole to apply a pressure of a reference medium to the first part, and including a target medium inlet hole to apply a pressure of a target medium to the second part, wherein the reference medium inlet hole is provided in a first surface of the housing, wherein the target medium inlet hole is provided in a second surface of the housing other than the first surface, and wherein the lead frame includes one or more insertion terminals configured to be inserted into and electrically connected to terminal holes of a wire connector.

15 Claims, 7 Drawing Sheets

(51) Int. Cl.
*G01L 5/10* (2020.01)
*G01L 19/06* (2006.01)
*G01D 11/24* (2006.01)
*G01L 19/14* (2006.01)

(52) U.S. Cl.
CPC ............ *G01L 19/06* (2013.01); *G01L 19/143* (2013.01); *G01L 19/147* (2013.01)

(58) Field of Classification Search
CPC ............. G01L 19/0084; G01L 19/0038; G01L 13/025; G01L 19/0654; G01D 11/245
USPC .......................................................... 73/756
See application file for complete search history.

(56) References Cited

FOREIGN PATENT DOCUMENTS

| | | | | |
|---|---|---|---|---|
| CN | 105300593 A | | 2/2016 | |
| JP | 09178596 A | * | 7/1997 | |
| JP | H09178596 A | | 7/1997 | |
| JP | 2000055761 A | * | 2/2000 | |
| JP | 2000055761 A | | 2/2000 | |
| JP | 2001174355 A | | 6/2001 | |
| KR | 20070104194 A | * | 10/2007 | ......... G01L 19/0084 |
| KR | 1020070104194 | | 10/2007 | |
| KR | 1014865180000 | | 1/2015 | |

* cited by examiner

PRESSURE SENSOR APPARATUS AND METHOD FOR MANUFACTURING PRESSURE SENSOR APPARATUS AND PRESSURE SENSOR ASSEMBLY

TECHNICAL FIELD

The present invention relates to a pressure sensor apparatus, a pressure sensor assembly, and a method of manufacturing the pressure sensor apparatus, and more particularly, to a pressure sensor apparatus directly connectable to a wire connector, a pressure sensor assembly, and a method of manufacturing the pressure sensor apparatus.

BACKGROUND ART

In general, a washing machine refers to an apparatus for washing, rinsing, and spin-drying clothes by using a detergent and water supplied into a tub, and a controller of the washing machine includes a pressure sensor capable of appropriately controlling water supply based on a preset water level or a water level manually set by a user.

The pressure sensor has a structure in which a metal coil and a magnetic bar move due to variations in air pressure caused by variations in the level of a target medium, e.g., water, and operates on the principle of frequency oscillation due to changes in inductance.

Pressure sensors used in various pressure measurement systems, e.g., a tire pressure monitoring system (TPMS) for measuring a tire pressure of a vehicle, may operate on the same principle.

As steam washing machines are currently popularized, research is being actively conducted on a pressure sensor capable of more precisely sensing a water level.

However, since pressure sensors have sensitivity of several kHz in the output frequency variation and the output value varies in the form of a non-linear quadratic curve, a water level may not be precisely sensed. In addition, when steam is excessively generated or water is continuously supplied, an excessively high pressure may be generated and thus the pressure sensor may be damaged or broken.

DETAILED DESCRIPTION OF THE INVENTION

Technical Problem

The present invention provides a pressure sensor apparatus, a pressure sensor assembly, and a method of manufacturing the pressure sensor apparatus, by which firm assembly and excellent durability may be achieved by directly connecting a lead frame to a wire connector, production costs of products may be reduced and productivity may be increased by omitting a substrate or a bracket, and a water level of a washing machine, a tire pressure, or the like may be precisely sensed. However, the scope of the present invention is not limited thereto.

Technical Solution

According to an aspect of the present invention, there is provided a pressure sensor apparatus including a lead frame, a pressure sensing element mounted on the lead frame to measure a relative pressure between a first part and a second part, and a housing including a reference medium inlet hole to apply a pressure of a reference medium to the first part, and including a target medium inlet hole to apply a pressure of a target medium to the second part, wherein the reference medium inlet hole is provided in a first surface of the housing, wherein the target medium inlet hole is provided in a second surface of the housing other than the first surface, and wherein the lead frame includes one or more insertion terminals that are configured to be inserted into and electrically connected to terminal holes of a wire connector.

The insertion terminals may have pointed tips and thus may be easily insertable into the terminal holes of the wire connector.

The housing may include a first housing including the reference medium inlet hole and the target medium inlet hole in different directions, having a first internal area connected to the reference medium inlet hole and a second internal area connected to the target medium inlet hole, and installed in a side direction of the lead frame, and a second housing having a third internal area for allowing the reference medium of the first internal area to reach the first part through the lead frame, and installed in another side direction of the lead frame.

The reference medium inlet hole and the target medium inlet hole may extend in perpendicular directions.

The housing may further include a molded member including an opening for exposing the first part of the pressure sensing element to the reference medium, and one or more barriers for forming the first and second internal areas, and molded to a shape surrounding the part of the lead frame.

An adhesive sealing member may be provided between the molded member and the first housing and between the molded member and the second housing.

The molded member may include wings provided between neighboring insertion terminals of the lead frame and inserted into wing holes of the wire connector to prevent a short circuit.

A pressure transfer medium may be provided on the second part of the pressure sensing element to protect the pressure sensing element and to transfer the pressure of the target medium to the second part.

The pressure transfer medium may have a waterproof function to prevent direct contact between the target medium and the pressure sensing element.

The pressure transfer medium may include gel having a variable shape depending on the pressure of the target medium.

The pressure transfer medium may include silicone or epoxy having a variable shape depending on the pressure of the target medium.

The pressure sensor apparatus may further include an integrated chip (IC) mounted on the lead frame to convert an analog signal output from the pressure sensing element, into a digital signal.

The lead frame may include a first guide for guiding the reference medium supplied from the reference medium inlet hole, in a first direction, and a second guide for guiding the reference medium in a second direction opposite to the first direction, to the pressure sensing element.

According to another aspect of the present invention, there is provided a method of manufacturing a pressure sensor apparatus, the method including a lead frame preparation step, for preparing a lead frame including one or more insertion terminals, a pressure sensing element mounting step, for mounting, on the lead frame, a pressure sensing element capable of measuring a relative pressure between a first part and a second part, and a housing installation step, for installing, around the pressure sensing element, a housing including a reference medium inlet hole to apply a pressure of a reference medium to the first part, and including a target medium inlet hole to apply a pressure of a target medium to the second part.

In the pressure sensing element mounting step, an integrated chip (IC) for converting an analog signal output from the pressure sensing element, into a digital signal may be mounted on the lead frame.

The housing installation step may include a molding step, for molding, on the lead frame, a molded member including an opening for exposing the first part of the pressure sensing element to the reference medium, and having a shape surrounding a part of the lead frame, a coating step, for coating an adhesive sealing member on both surfaces of the molded member, and an assembly step, for assembling the first and second housings to the adhesive sealing member.

After the molding step, the housing installation step may further include a pressure transfer medium providing step, for providing a pressure transfer medium on the second part of the pressure sensing element in the molded member to protect the pressure sensing element and to transfer the pressure of the target medium to the second part.

According to another aspect of the present invention, there is provided a pressure sensor assembly including a lead frame, a pressure sensing element mounted on the lead frame to measure a relative pressure between a first part and a second part, a housing including a reference medium inlet hole to apply a pressure of a reference medium to the first part, and including a target medium inlet hole to apply a pressure of a target medium to the second part, and a wire connector connected to wires, wherein the reference medium inlet hole is provided in a first surface of the housing, wherein the target medium inlet hole is provided in a second surface of the housing other than the first surface, and wherein the lead frame includes one or more insertion terminals that are configured to be inserted into and electrically connected to terminal holes of the wire connector.

Advantageous Effects

As described above, according to an embodiment of the present invention, firm assembly and excellent durability may be achieved by directly connecting a lead frame to a wire connector, production costs of products may be reduced and productivity may be increased by omitting a substrate or a bracket, a water level of a washing machine, a tire pressure, or the like may be precisely sensed, a small product size may be achieved, water may be saved and power consumption may be reduced by precisely controlling a water level, and damage due to a target medium, e.g., water supplied to a washing machine or air filled in a tire, may be prevented. However, the scope of the present invention is not limited to the above effects.

BEST MODE

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the sizes of elements may be exaggerated or reduced for convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 1:
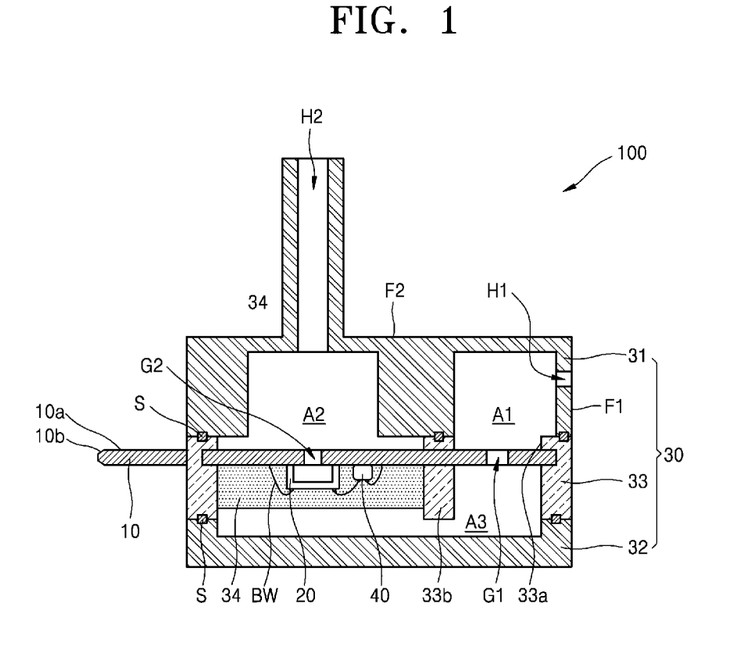
FIG. 1 is a cross-sectional view of a pressure sensor apparatus according to some embodiments of the present invention.
Figure 2:
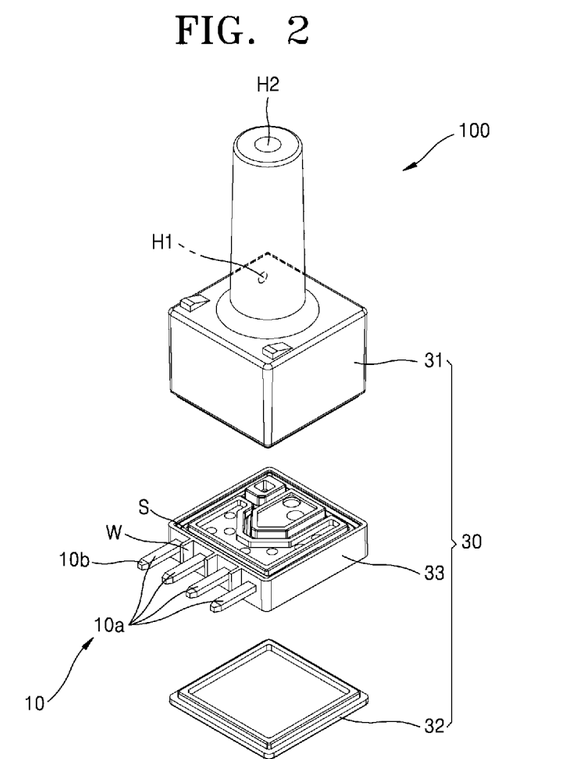
FIG. 2 is an exploded perspective view of the pressure sensor apparatus of FIG.

FIG. 1 is a cross-sectional view of a pressure sensor apparatus 100 according to some embodiments of the present invention. FIG. 2 is an exploded perspective view of the pressure sensor apparatus 100 of FIG. 1, and FIG. 3 is an assembled perspective view of the pressure sensor apparatus 100 of FIG. 1.

Figure 3:
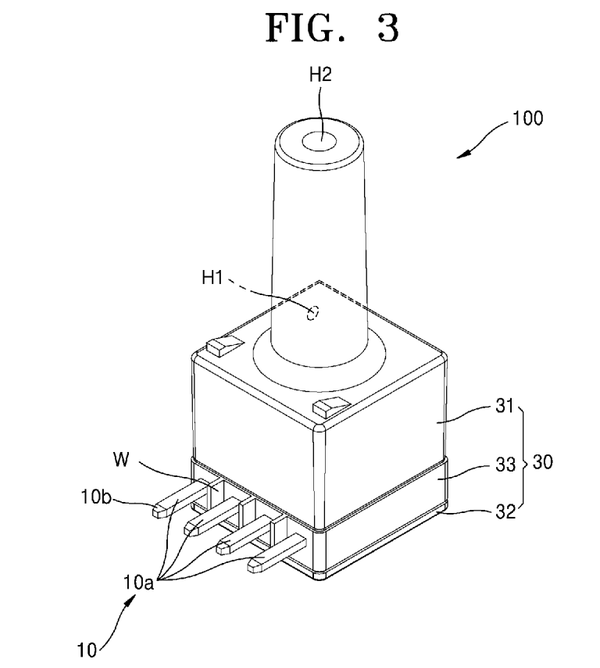
FIG. 3 is an assembled perspective view of the pressure sensor apparatus of FIG. 1.

Initially, as illustrated in FIGS. 1 to 3, the pressure sensor apparatus 100 according to some embodiments of the present invention may mainly include a lead frame 10, a pressure sensing element 20, and a housing 30.

For example, as illustrated in FIGS. 1 to 3, the lead frame 10 may be a metal frame structure which includes one or more (e.g., four in FIGS. 2 and 3) insertion terminals 10a inserted into terminal holes CH of a wire connector C (see FIG. 10) and electrically connected to wires 1 (see FIG. 10), and is produced using a conductive material, e.g., copper or aluminum, having a uniform thickness and a thin plate shape.

Unlike a conventional lead frame for soldering, the above lead frame 10 may have sufficient durability and rigidity and thus may not be damaged or broken even when repeatedly connected into and disconnected from the terminal holes CH of the wire connector C.

Specifically, for example, as illustrated in FIGS. 2 and 3, the insertion terminals 10a may have pointed tips 10b and thus may be easily insertable into the terminal holes CH of the wire connector C.

Therefore, the pointed tips 10b may reduce friction and insertion resistance against the wire connector C while being inserted into the terminal holes CH of the wire connector C, and thus a user may easily perform the insertion step.

For example, as illustrated in FIG. 1, the pressure sensing element 20 is mounted on and electrically connected to the lead frame 10 and may be any pressure sensor capable of measuring a relative pressure between a first part (e.g., a lower part in FIG. 1) and a second part (e.g., an upper part in FIG. 1).

Specifically, for example, the pressure sensing element 20 may be understood as a element including a diaphragm or the like and capable of outputting a pressure applied to the diaphragm, a displacement of the diaphragm, or the like as an analog signal by using various magnetic field sensors, magnetic sensors, proximity sensors, resistance sensors, inductive resistance sensors, strain gauges, etc. However, the pressure sensing element 20 is not limited thereto, and all pressure sensing elements capable of outputting pressure sensing signals including analog signals and digital signals may be used.

Herein, the pressure sensing element 20 may be mounted on the lead frame 10 and be electrically connected to the lead frame 10 by any of various signal transmission media BW such as bonding wires, bumps, and solders.

For example, as illustrated in FIGS. 1 to 3, the housing 30 may have a structure including a reference medium inlet hole H1 to apply a pressure of a reference medium to the first part, and including a target medium inlet hole H2 to apply a pressure of a target medium to the second part.

Specifically, for example, as illustrated in FIGS. 1 to 3, the reference medium inlet hole H1 may be provided in a first surface F1 of the housing 30, e.g., a side surface of the housing 30 in FIG. 1, and the target medium inlet hole H2 may extend from a second surface F2 of the housing 30 other than the first surface F1, e.g., a top surface of the housing 30 in FIG. 1.

Herein, for example, as illustrated in FIGS. 1 to 3, the housing 30 may include a first housing 31, a second housing 32, and a molded member 33.

Specifically, for example, the first housing 31 may include the reference medium inlet hole H1 and the target medium inlet hole H2 in different directions, have a first internal area A1 connected to the reference medium inlet hole H1 and a second internal area A2 connected to the target medium inlet hole H2, and be installed in a side direction of the lead frame 10.

In the first housing 31, the reference medium inlet hole H1 and the target medium inlet hole H2 may extend in perpendicular directions.

The reference medium inlet hole H1 and the target medium inlet hole H2 may have equal inner diameters, or one of the reference medium inlet hole H1 and the target medium inlet hole H2 may have an inner diameter greater than that of the other.

Therefore, using the first housing 31 in which the pressure of the reference medium and the pressure of the target medium are applied in perpendicular directions and influence each other as least as possible, the pressures of the reference medium and the target medium may be independently applied without influencing each other and thus may always be accurately and precisely measured in any environment or situation.

For example, the second housing 32 may have a third internal area A3 for allowing the reference medium of the first internal area A1 to reach the first part through the lead frame 10, and may be installed in another side direction of the lead frame 10.

For example, the molded member 33 may include an opening 33a for exposing the first part of the pressure sensing element 20 to the reference medium, and one or more barriers 33b for forming the first and second internal areas A1 and A2, and may be molded to a shape surrounding the part of the lead frame 10.

Herein, an adhesive sealing member S may be provided between the molded member 33 and the first housing 31 and between the molded member 33 and the second housing 32 not only to fix and firmly assemble the first housing 31, the molded member 33, and the second housing 32 to each other, but also to define the first, second, and third internal areas A1, A2, and A3 as separate areas.

For example, as illustrated in FIGS. 1 to 3, the molded member 33 may include wings W provided between neighboring insertion terminals 10a of the lead frame 10 and inserted into wing holes WH (see FIG. 10) of the wire connector C to prevent a short circuit.

Figure 10:
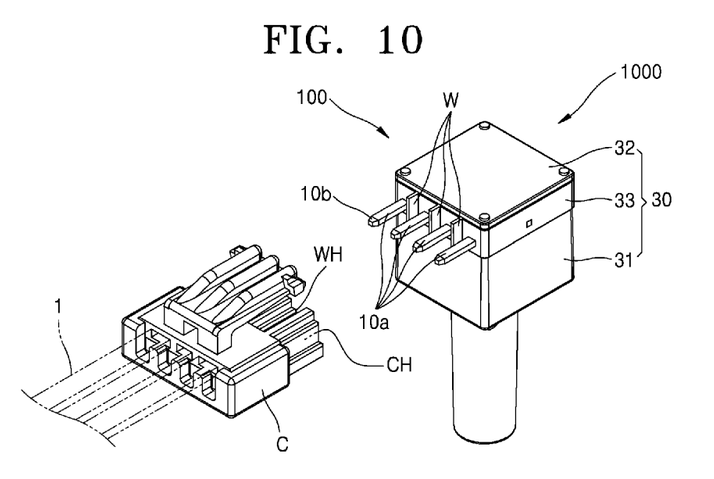
FIG. 10 is an exploded perspective view of a pressure sensor assembly according to some embodiments of the present invention.

Therefore, when the molded member 33 is assembled to the wire connector C, the wings W may be inserted into the wing holes WH and thus a short circuit between or an insertion error or malfunction of the insertion terminals 10a may be completely prevented. The molded member 33 may be separately molded or insert-molded.

For example, as illustrated in FIGS. 1 to 3, a pressure transfer medium 34 may be molded on the second part of the pressure sensing element 20 between the molded member 33 and the lead frame 10 to protect the pressure sensing element 20 and to transfer the pressure of the target medium to the second part.

Specifically, for example, the pressure transfer medium 34 has a waterproof function to prevent direct contact between the target medium and the pressure sensing element 20, and may include gel, silicone, epoxy, or the like, which has a variable shape depending on the pressure of the target medium.

For example, the pressure transfer medium 34 may use a silicone-based material (having a young's modulus value of 0.001 GPa to 0.05 GPa) or an epoxy-based material (having a young's modulus value of 2.0 GPa to 20.0 GPa), which is used to protect a semiconductor integrated chip (IC) and a microelectromechanical system (MEMS) sensor. Both the two materials have excellent waterproof functions, and the silicone-based material has a pressure transfer function superior to that of the epoxy-based material due to a difference in young's modulus between the materials. The young's modulus value is a longitudinal elastic modulus, and a material having a small young's modulus value contracts well and transfers pressure well.

The above materials may be provided in the form of gel capable of performing a waterproof function and a function of transferring a pressure of a fluid to the pressure sensing element 20 including the diaphragm. The gel indicates a state in which a colloid solution is solidified above a certain density like jelly, and a pressure applied thereto may be transferred to the pressure sensing element 20.

Therefore, when the pressure of the target medium, e.g., water supplied to a washing machine or air filled in a tire, is transferred to the pressure transfer medium 34 and thus the pressure transfer medium 34 is deformed, the deformation may be indirectly transferred to the pressure sensing element 20 and thus a pressure value may be accurately and precisely measured without causing corrosion or damage of components.

As illustrated in FIG. 1, the pressure sensor apparatus 100 according to some embodiments of the present invention may further include an IC chip 40 mounted on the lead frame 10 to convert the analog signal output from the pressure sensing element 20, into a digital signal. The IC chip 40 may be understood as, for example, an analog front end.

Therefore, since the IC chip 40 may convert the analog signal generated by the pressure sensing element 20, into a digital signal having a low noise rate and transmit the digital signal through the lead frame 10 to an external device, the external device may receive may receive a more precise pressure signal.

In addition, the pressure sensor apparatus 100 according to some embodiments of the present invention may further include a regulator (not shown) capable of maintaining a certain voltage. The regulator may be understood as, for example, a low dropout (LDO) regulator. Herein, the regulator may or may not be used depending on a combination of a sensor and an IC. The regulator is known well and a detailed description thereof will not be provided herein.

As illustrated in FIG. 1, the lead frame 10 may include a first guide G1 for guiding the reference medium supplied from the reference medium inlet hole H1, in a first direction, and a second guide G2 for guiding the reference medium in a second direction opposite to the first direction, to the pressure sensing element 20.

Therefore, as illustrated in FIG. 1, the pressure sensor apparatus 100 according to some embodiments of the present invention operates as described below. Initially, the reference medium serving as a reference for measuring pressure, e.g., the air, may be supplied through the reference medium inlet hole H1 into the first internal area A1 of the first housing 31 in a horizontal direction.

Then, the reference medium may reach the third internal area A3 of the second housing 32 through the opening 33a of the molded member 33 and the first guide G1 of the lead frame 10.

Subsequently, the reference medium may reach the first part of the pressure sensing element 20 through the second guide G2 of the lead frame 10 and apply a reference pressure to the pressure sensing element 20.

As illustrated in FIG. 1, the target medium serving as a target for measuring pressure, e.g., water supplied to a washing machine or air filled in a tire, may be supplied through the target medium inlet hole H2 into the second internal area A2 of the first housing 31 in a vertical direction.

The vertical direction in which the target medium is supplied is perpendicular to the horizontal direction in which the reference medium is supplied and thus the two media may apply hydraulic pressures as independently as possible without influencing each other.

Then, the target medium may reach the pressure transfer medium 34, and the pressure transfer medium 34 may transfer the pressure to the second part of the pressure sensing element 20, as a target pressure to be measured by the pressure sensing element 20.

Accordingly, firm assembly and excellent durability may be achieved by directly connecting the lead frame 10 to the wire connector C, production costs of products may be reduced and productivity may be increased by omitting a substrate, a bracket, or the like, a water level of a washing machine, a tire pressure, or the like may be precisely sensed, a small product size may be achieved, water may be saved and power consumption may be reduced by precisely controlling a water level, and damage due to the target medium, e.g., water supplied to a washing machine or air filled in a tire, may be prevented.

FIGS. 4 to 9 are perspective views illustrating sequential steps for manufacturing the pressure sensor apparatus 100 of FIG. 2.

Figure 4:
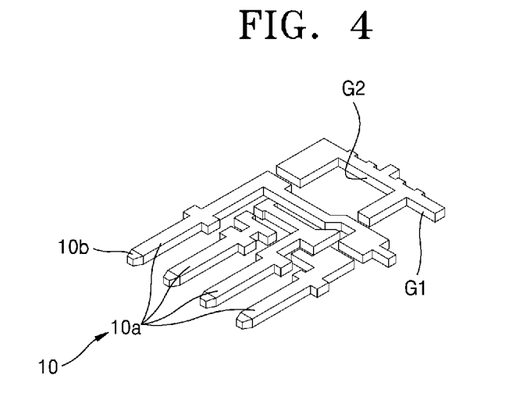
FIGS. 4 to 9 are perspective views illustrating sequential steps for manufacturing the pressure sensor apparatus of FIG. 2.

As illustrated in FIGS. 4 to 9, the pressure sensor apparatus 100 of FIG. 2 is manufactured as described below. Initially, as illustrated in FIG. 4, the lead frame 10 including one or more insertion terminals 10a may be prepared.

In this case, although not shown in FIG. 4, the lead frame 10 may be provided in the form of a matrix of a plurality of connected lead frame strips to be cut apart later.

Figure 5:
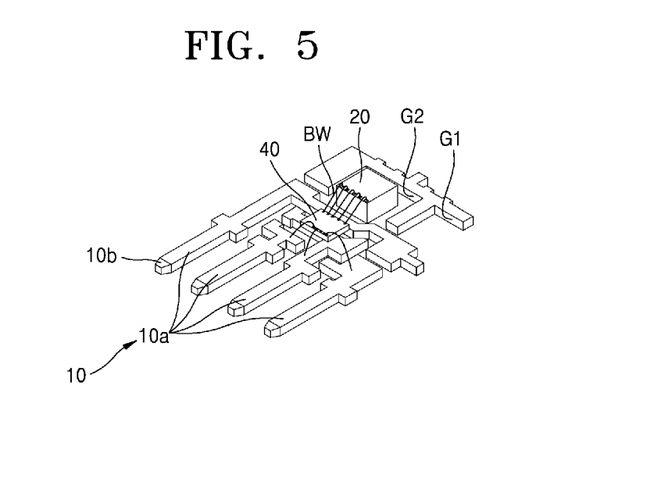

Then, as illustrated in FIG. 5, the molded member 33 including the opening 33a and having a shape surrounding the part of the lead frame 10 may be molded on the lead frame 10 by using a mold (not shown).

Figure 6:
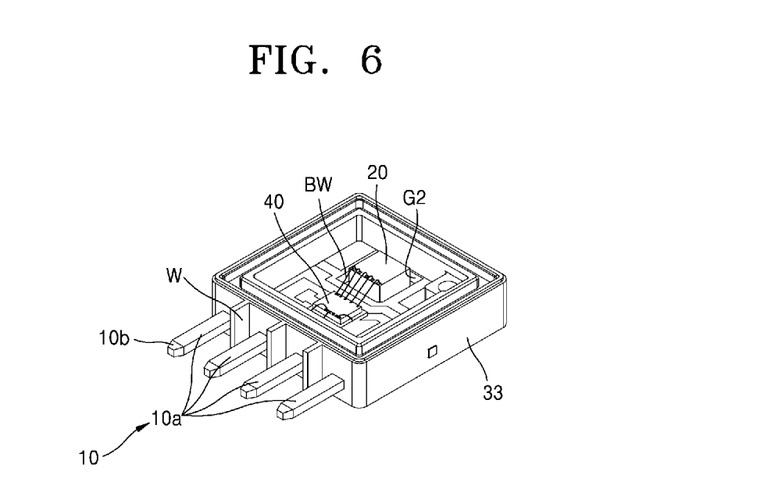

Thereafter, as illustrated in FIG. 6, the pressure sensing element 20 capable of measuring a relative pressure between a first part and a second part may be mounted on the lead frame 10, and may be electrically connected to the lead frame 10 by using the signal transmission medium BW such as bonding wires.

In this case, the IC chip 40 for converting an analog signal output from the pressure sensing element 20, into a digital signal may be mounted on the lead frame 10 together with the pressure sensing element 20.

Figure 7:
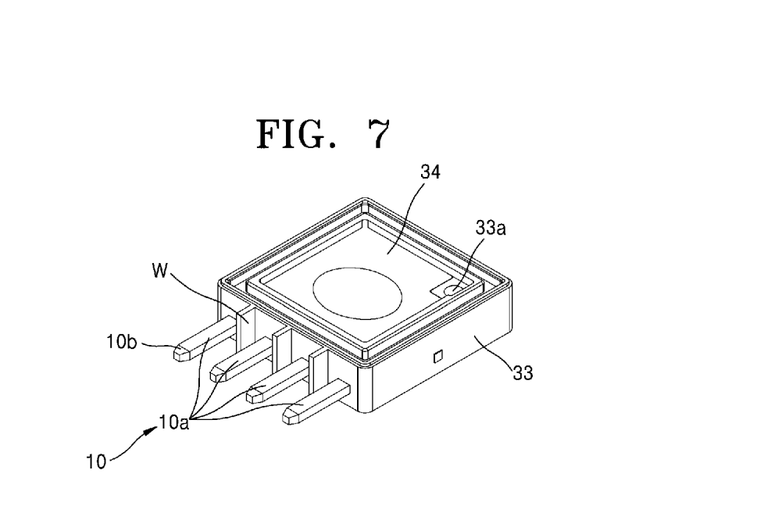

Subsequently, as illustrated in FIG. 7, the pressure transfer medium 34 may be provided on the second part of the pressure sensing element 20 in the molded member 33 by using a dispenser or a mold to protect the pressure sensing element 20 and to transfer a pressure of a target medium to the second part.

Figure 8:
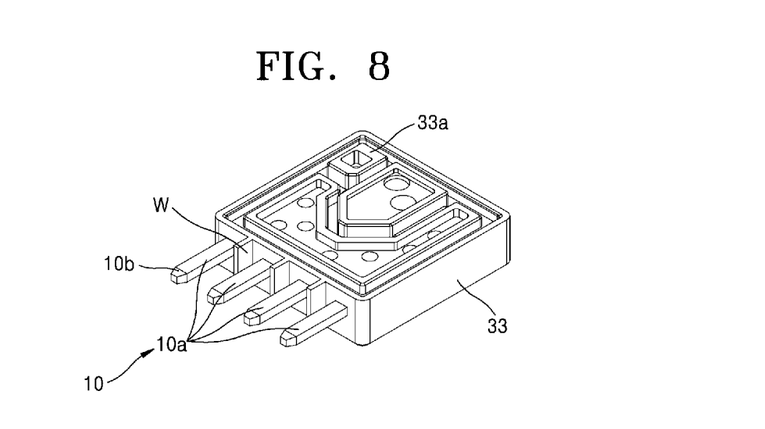
Figure 9:
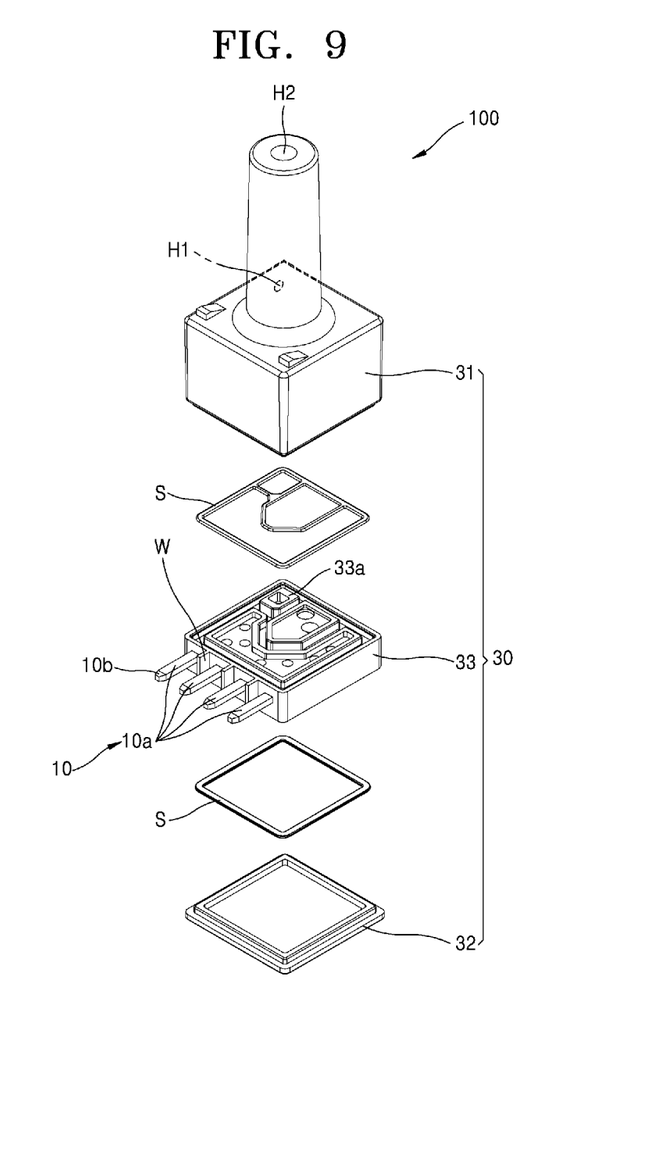

Then, as illustrated in FIG. 9, the adhesive sealing member S, e.g., silicone, may be patterned and coated on both sides of the molded member 33 of FIGS. 7 and 8, and the first and second housings 31 and 32 may be assembled to the adhesive sealing member S, thereby installing, around the pressure sensing element 20, the housing 30 including the reference medium inlet hole H1 to apply a pressure of a reference medium to the first part, and including the target medium inlet hole H2 to apply the pressure of the target medium to the second part.

FIG. 10 is an exploded perspective view of a pressure sensor assembly 1000 according to some embodiments of the present invention.

As illustrated in FIG. 10, the pressure sensor assembly 1000 according to some embodiments of the present invention may include a lead frame 10, a pressure sensing element 20 mounted on the lead frame 10 to measure a relative pressure between a first part and a second part, a housing 30 including a reference medium inlet hole H1 to apply a pressure of a reference medium to the first part, and including a target medium inlet hole H2 to apply a pressure of a target medium to the second part, and a wire connector C connected to wires 1.

Herein, the reference medium inlet hole H1 may be provided in a first surface F1 of the housing 30, the target medium inlet hole H2 may be provided in a second surface F2 of the housing 30 other than the first surface F1, and the lead frame 10 may include one or more insertion terminals 10a inserted into and electrically connected to terminal holes CH of the wire connector C.

Configurations and functions of the lead frame 10, the pressure sensing element 20, and the housing 30 are the same as the configurations and functions of those of the above-described pressure sensor apparatus 100 according to some embodiments of the present invention, and detailed descriptions thereof will not be provided herein.

Figure 11:
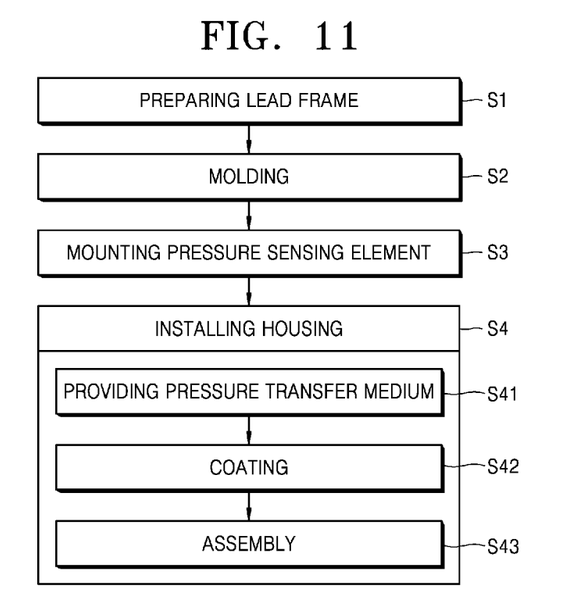
FIG. 11 is a flowchart of a method of manufacturing the pressure sensor apparatus, according to some embodiments of the present invention.

FIG. 11 is a flowchart of a method of manufacturing the pressure sensor apparatus 100, according to some embodiments of the present invention.

As illustrated in FIGS. 1 to 11, the method according to some embodiments of the present invention may include a lead frame preparation step S1 for preparing the lead frame 10 including one or more insertion terminals 10a, a molding step S2 for molding, on the lead frame 10, the molded member 33 including the opening 33a and having a shape surrounding a part of the lead frame 10, a pressure sensing element mounting step S3 for mounting, on the lead frame 10, the pressure sensing element 20 capable of measuring a relative pressure between a first part and a second part, and a housing installation step S4 for installing, around the pressure sensing element 20, the first and second housings 31 and 32 including the reference medium inlet hole H1 to apply a pressure of a reference medium to the first part, and including the target medium inlet hole H2 to apply a pressure of a target medium to the second part.

In the pressure sensing element mounting step S3, the IC chip 40 for converting an analog signal output from the pressure sensing element 20, into a digital signal may be mounted on the lead frame 10.

Herein, the housing installation step S4 may include a pressure transfer medium providing step S41 for providing the pressure transfer medium 34 on the second part of the pressure sensing element 20 in the molded member 33 to protect the pressure sensing element 20 and to transfer the pressure of the target medium to the second part, a coating step S42 for coating the adhesive sealing member S on both surfaces of the molded member 33, and an assembly step S43 for assembling the first and second housings 31 and 32 to the adhesive sealing member S.

As described above, according to the present invention, defects of a pressure sensor apparatus in a pressure sensing element, an IC chip, etc. due to a fluid or moisture may be prevented by employing a pressure transfer medium. Furthermore, although a fluid inlet hole is provided at a lower side and thus a waterproof function at the lower side of the pressure sensor apparatus may be weak, defects due to moisture may be prevented by surrounding the pressure sensor apparatus with a housing having a waterproof function and capable of protecting the exterior of the pressure sensor apparatus.

In addition, since characteristics of the pressure sensing element is changed if the pressure transfer medium is hardened, the pressure sensing element may appropriately operate by employing a barrier structure to fix the pressure transfer medium having a low viscosity and provided in the form of waterproof gel. Besides, by providing the housing in a separable structure and providing the fluid inlet hole and an air inlet hole in different not-parallel directions, a pressure sensor apparatus capable of achieving high productivity based on automatic assembly or the like, having a simple structure, and capable of easily mounting a sensor chip and an IC chip in a manufacturing process may be implemented.

While the present invention has been particularly shown and described with reference to embodiments thereof, it will be understood by one of ordinary skill in the art that various changes in form and details may be made therein without departing from the spirit and scope of the present invention as defined by the following claims.

INDUSTRIAL APPLICABILITY

As described above, according to an embodiment of the present invention, firm assembly and excellent durability may be achieved by directly connecting a lead frame to a wire connector, and a product assembly process may be simplified and production costs may be reduced by omitting a substrate or a bracket.

The invention claimed is:

1. A pressure sensor apparatus comprising:
a lead frame;
a pressure sensing element mounted on the lead frame to measure a relative pressure between a first part and a second part; and
a housing comprising a reference medium inlet hole to apply a pressure of a reference medium to the first part, and comprising a target medium inlet hole to apply a pressure of a target medium to the second part,
wherein the reference medium inlet hole is provided in a first surface of the housing,
wherein the target medium inlet hole is provided in a second surface of the housing other than the first surface, and
wherein the lead frame one or more insertion terminals that are configured to be inserted into and electrically connected to terminal holes of a wire connector,
wherein the housing comprises:
a first housing comprising the reference medium inlet hole and the target medium inlet hole in different directions, having a first internal area connected to the reference medium inlet hole and a second internal area connected to the target medium inlet hole, and installed in a side direction of the lead frame, such that the pressures of the reference medium and the target medium are independently applied without influencing each other;
a second housing having a third internal area for allowing the reference medium of the first internal area to reach the first part through the lead frame, and installed in another side direction of the lead frame; and
a molded member comprising an opening for exposing the first part of the pressure sensing element to the reference medium, and one or more barriers for forming the first and second internal areas, and molded to a shape surrounding the part of the lead frame,
wherein the lead frame comprises a first guide for guiding the reference medium supplied from the reference medium inlet hole, in a first direction, and a second guide
for guiding the reference medium in a second direction opposite to the first direction, to the pressure sensing element.

2. The pressure sensor apparatus of claim 1, wherein the insertion terminals have pointed tips and thus are easily insertable into the terminal holes of the wire connector.

3. The pressure sensor apparatus of claim 1, wherein the reference medium inlet hole and the target medium inlet hole extend in perpendicular directions.

4. The pressure sensor apparatus of claim 1, wherein an adhesive sealing member is provided between the molded member and the first housing and between the molded member and the second housing.

5. The pressure sensor apparatus of claim 1, wherein the molded member comprises wings provided between neighboring insertion terminals of the lead frame and inserted into wing holes of the wire connector to prevent a short circuit.

6. The pressure sensor apparatus of claim 1, wherein a pressure transfer medium is provided on the second part of the pressure sensing element to protect the pressure sensing element and to transfer the pressure of the target medium to the second part.

7. The pressure sensor apparatus of claim 6, wherein the pressure transfer medium has a waterproof function to prevent direct contact between the target medium and the pressure sensing element.

8. The pressure sensor apparatus of claim 7, wherein the pressure transfer medium comprises gel having a variable shape depending on the pressure of the target medium.

9. The pressure sensor apparatus of claim 7,
wherein the pressure transfer medium comprises silicone or epoxy having a variable shape depending on the pressure of the target medium.

10. The pressure sensor apparatus of claim 1, further comprising:
an integrated chip (IC) mounted on the lead frame to convert an analog signal output from the pressure sensing element, into a digital signal.

11. A method of manufacturing a pressure sensor apparatus, the method comprising:
a lead frame preparation step, for preparing a lead frame comprising one or more insertion terminals;
a molding step, for molding, on the lead frame, a molded member comprising an opening and having a shape surrounding a part of the lead frame;
a pressure sensing element mounting step, for mounting, on the lead frame, a pressure sensing element capable of measuring a relative pressure between a first part and a second part; and
a housing installation step, for installing, around the pressure sensing element, first and second housings comprising a reference medium inlet hole to apply a pressure of a reference medium to the first part, and comprising a target medium inlet hole to apply a pressure of a target medium to the second part,
wherein, in the lead frame preparation step, the lead frame comprises a first guide for guiding the reference medium supplied from the reference medium inlet hole, in a first direction, and a second guide for guiding the reference medium in a second direction opposite to the first direction, to the pressure sensing element,
wherein, in the molding step, the molded member comprises an opening for exposing the first part of the pressure sensing element to the reference medium, and one or more barriers for forming first and second internal areas, and the molded member is molded to a shape surrounding the part of the lead frame, and
wherein, in the housing installation step, the reference medium inlet hole and the target medium inlet hole are in different directions, such that the pressures of the reference medium and the target medium are independently applied without influencing each other;
the first housing comprises a first internal area connected to the reference medium inlet hole and a second internal area connected to the target medium inlet hole, and installed in a side direction of the lead frame; and
the second housing comprises a third internal area for allowing the reference medium of the first internal area to reach the first part through the lead frame, and installed in another side direction of the lead frame.

12. The method of claim 11,
wherein, in the pressure sensing element mounting step, an integrated chip (IC) for converting an analog signal output from the pressure sensing element, into a digital signal is mounted on the lead frame.

13. The method of claim 11,
wherein the housing installation step comprises:
a coating step, for coating an adhesive sealing member on both surfaces of the molded member; and
an assembly step, for assembling the first and second housings to the adhesive sealing member.

14. The method of claim 13,
wherein, before the coating step, the housing installation step further comprises a pressure transfer medium providing step, for providing a pressure transfer medium on the second part of the pressure sensing element in the molded member to protect the pressure sensing element and to transfer the pressure of the target medium to the second part.

15. A pressure sensor assembly comprising:
a lead frame;
a pressure sensing element mounted on the lead frame to measure a relative pressure between a first part and a second part;
a housing comprising a reference medium inlet hole to apply a pressure of a reference medium to the first part, and comprising a target medium inlet hole to apply a pressure of a target medium to the second part; and
a wire connector connected to wires,
wherein the reference medium inlet hole is provided in a first surface of the housing,
wherein the target medium inlet hole is provided in a second surface of the housing other than the first surface, and
wherein the lead frame includes one or more insertion terminals that are configured to be inserted into and electrically connected to terminal holes of the wire connector,
wherein the housing comprises:
a first housing comprising the reference medium inlet hole and the target medium inlet hole in different directions, having a first internal area connected to the reference medium inlet hole and a second internal area connected to the target medium inlet hole, and installed in a side direction of the lead frame, such that the pressures of the reference medium and the target medium are independently applied without influencing each other;
a second housing having a third internal area for allowing the reference medium of the first internal area to reach the first part through the lead frame, and installed in another side direction of the lead frame; and
a molded member comprising an opening for exposing the first part of the pressure sensing element to the reference medium, and one or more barriers for forming the first and second internal areas, and molded to a shape surrounding the part of the lead frame,
wherein the lead frame comprises a first guide for guiding the reference medium supplied from the reference medium inlet hole, in a first direction, and a second guide for guiding the reference medium in a second direction opposite to the first direction, to the pressure sensing element.

* * * * *